(12) United States Patent
Berman

(10) Patent No.: US 8,591,235 B1
(45) Date of Patent: Nov. 26, 2013

(54) HANDWRITING GLOVE APPARATUS

(76) Inventor: Amy Berman, Stroudsburg, PA (US)

(*) Notice: Subject to any disclaimer, the term of this patent is extended or adjusted under 35 U.S.C. 154(b) by 175 days.

(21) Appl. No.: 13/088,177

(22) Filed: Apr. 15, 2011

(51) Int. Cl.
G09B 11/02 (2006.01)

(52) U.S. Cl.
USPC .......................................................... 434/166

(58) Field of Classification Search
USPC ................... 434/162–166; 2/159, 160, 161.6
See application file for complete search history.

(56) References Cited

U.S. PATENT DOCUMENTS

| | | | | |
|---|---|---|---|---|
| 371,814 | A | 10/1887 | Bearce | |
| 1,247,183 | A * | 11/1917 | Usterud | 2/163 |
| 3,629,867 | A * | 12/1971 | Taylor | 2/160 |
| 3,787,898 | A | 1/1974 | Walker | |
| 4,447,912 | A * | 5/1984 | Morrow | 2/159 |
| 4,526,547 | A * | 7/1985 | Rusk | 434/166 |
| 4,602,885 | A * | 7/1986 | Bischoff et al. | 401/6 |
| 4,689,020 | A | 8/1987 | Rusk | |
| 4,957,442 | A * | 9/1990 | Prater | 434/166 |
| 5,310,345 | A | 5/1994 | Gershon | |
| 5,597,189 | A * | 1/1997 | Barbee, Sr. | 294/25 |
| 5,662,423 | A | 9/1997 | Walden | |
| 5,722,575 | A | 3/1998 | Smith | |
| 5,853,210 | A * | 12/1998 | Robinson | 294/25 |
| 5,980,257 | A | 11/1999 | Heinz | |
| 6,550,068 | B1 * | 4/2003 | Materon | 2/160 |
| 6,637,962 | B1 | 10/2003 | Roche et al. | |
| 6,705,778 | B2 * | 3/2004 | Yoshida et al. | 396/572 |
| 6,881,065 | B1 * | 4/2005 | Land | 434/166 |
| 7,128,484 | B2 | 10/2006 | Schulken | |
| D544,035 | S * | 6/2007 | Snyder et al. | D19/54 |
| 7,371,026 | B2 | 5/2008 | Berger | |
| 7,794,163 | B2 | 9/2010 | Bush, III et al. | |

* cited by examiner

Primary Examiner — Kurt Fernstrom
(74) Attorney, Agent, or Firm — Cheryl R. Figlin, Esq.; Feigin & Associates, LLC

(57) ABSTRACT

Embodiments of the disclosed technology comprise a glove apparatus for teaching handwriting skills. The glove apparatus has a glove with a holder for a writing implement permanently attached to the glove. This holder grips the outer surface of a writing implement. The outer surface of the holder is attached to the glove at the thumb, pointer and middle fingers such that when the glove is put on the hand, the hand is in the proper position to learn handwriting skills. Finally a writing implement can be placed into the holder for writing and can be taken out of the holder when needed.

20 Claims, 5 Drawing Sheets

HANDWRITING GLOVE APPARATUS

FIELD OF THE DISCLOSED TECHNOLOGY

The disclosed technology relates generally to device for teaching proper handwriting, and more particularly, to a glove apparatus used to teach handwriting skills.

BACKGROUND OF THE DISCLOSED TECHNOLOGY

Teaching young children to write can sometimes be quite difficult. There are also adults who through injury or illness need to relearn writing skills. In both these instances, proper placement of a writing implement in the hand is a key factor to teaching writing skills. A writing apparatus that teaches proper placement of the hands and fingers for writing are sought after by therapists and teachers in this field. Gloves are currently known for providing protection, cleanliness, and warmth. A writing apparatus that is as simple as putting on a glove would be very effective. A glove having a writing implement holder permanently positioned in the proper configuration for handwriting when one puts on the glove would achieve this goal.

An issue in teaching writing is simple finger placement on the writing implement. Writing apparatuses for teaching writing are known in the art. With these writing apparatuses placement of the fingers still needs to be adjusted to make sure the fingers are in the proper position. By putting this writing apparatus in glove form, achieving the proper position of the hands and fingers is quick, easy and simple. This glove could have only three finger cavities for the thumb, pointer and middle fingers. While the glove could have cavities for the ring and pinky fingers, simple apertures for the ring and pinky fingers to go through could also suffice.

Accordingly, there exists the need for new and useful methods and devices for teaching hand writing. It is, therefore, to the effective resolution of the aforementioned problems and shortcomings of the prior art that the disclosed technology is directed.

SUMMARY OF THE DISCLOSED TECHNOLOGY

The disclosed technology described herein addresses an unfulfilled need in the prior art by providing a method for teaching handwriting with a simple apparatus that goes on as a glove.

One objective of the disclosed technology is to provide a glove apparatus for teaching handwriting skills. The glove apparatus has a glove with a holder for a writing implement permanently attached to the glove. This holder has a hollow cylindrical body with an inner surface capable of gripping the outer surface of a writing implement. The outer surface of the hollow cylindrical body is attached to the glove at the thumb, pointer and middle fingers such that when the glove is put on the hand, the hand is in the proper position to learn handwriting skills. Finally, a writing implement is be placed into the hollow cylindrical body for writing and can be taken out of the hollow cylindrical body when needed.

Another objective is to have a handwriting glove apparatus with a glove body for receiving a user's hand. The glove body having a palm side face, a back side face, a thumb lateral side region and an opposed lateral side region opposite said thumb lateral side region. The glove body comprising a central component for receiving the palm of said user's hand, a wrist cuff component for disposition around said user's wrist, and three or more finger cavities extending from the central component for receiving the fingers and thumb. A hollow cylindrical body writing implement holder having an inner and outer surface, wherein the writing implement holder inner surface accepts a pressure fit of the outside surface of a writing implement. The writing implement holder also having an outside surface that is attached to the glove such that when a hand is in the writing apparatus holder the hand is in the proper position to learn handwriting skills. The glove having five finger cavities extend from the central component for receiving the fingers and thumbs of said user's hand.

Alternatively, three finger cavities extend from said central component for receiving the pointer and middle fingers and thumb of said user's hand; and the pinky and ring fingers go through apertures in central component. Another objective of the invention is to have one embodiment where the hollow cylindrical body writing implement holder inner surface have a diameter of 0.25 inches and a length of 1.66 inches. Another option is for the inner surface diameter is 0.625 inches.

In yet another objective the gloves would come in different sizes to fit a child, adult female and adult male hands. Also the hollow cylindrical body writing implement holder is made of one of the following materials: plastic; rubber; or foam.

It is also an object of the disclosed technology that the hollow cylindrical body writing implement holder be attached to the glove with glue, hot glue from a hot glue gun, sewing with thread or epoxy. Alternatively the attachment can be with snaps. In the snaps embodiment the writing implement holder comes in different diameters for different diameter writing implements and these writing implement holders can be changed for different writing implements.

Another objective is to have the writing implement holder's outer surface attached to the glove at thumb, pointer and middle finger cavities of the glove in a mature tripod grasp such that when a hand is in the writing apparatus holder the hand is in the proper position to learn handwriting skills. The mature tripod grasp positions the middle finger to one side of the writing implement and the writing implement is situated between the middle and distal knuckle of the middle finger; next the pointer finger tip generally on the top of the writing implement; and finally, the grasp positions the thumb to the opposite side of the writing implement from the middle finger.

In another objective of the disclosed invention a method of using a handwriting glove apparatus to teach handwriting skills comprising the following steps: donning a glove comprising a writing implement holder of a substantially tubular shape having an inner and outer surface, wherein the writing implement holder has an outside surface that is connected to the glove such that when a hand is in the writing apparatus holder the hand is in the proper position to learn handwriting skills. After said glove is on a users hand placing a writing instrument in said writing implement holder. Alternatively, once could place the writing instrument into the writing implement holder and then done the glove on the user's hand. First a size of the glove apparatus to fit the user is determined, then the correct glove size is selected, then donning the glove.

In a final objective of the disclosed technology. A handwriting glove apparatus now has a circular clamp attached to the glove at the thumb, pointer and middle finger. The writing implement holder now fits inside the circular clamp and the writing implement is placed in the writing implement holder. The circular clamp has an adjustable diameter such that different size writing implement holders can be placed therein.

In accordance with these and other objectives, which will become apparent hereinafter, the disclosed technology will now be described with particular reference to the drawings.

Figure 1:
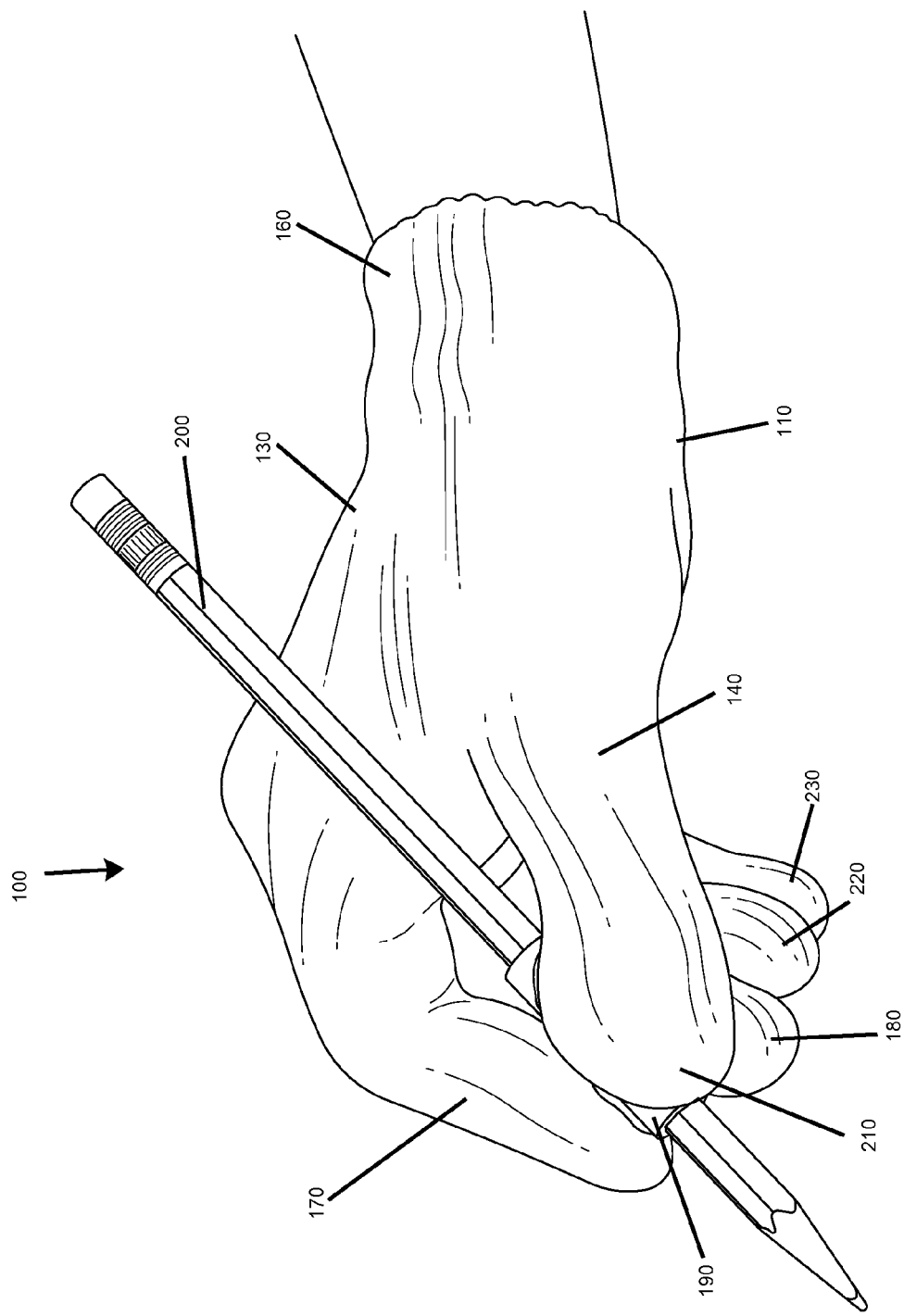
FIG. 1 shows a perspective view of the handwriting glove apparatus device of the disclosed technology as it is worn on the hand.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The ensuing detailed description provides preferred exemplary embodiments only, and is not intended to limit the scope, applicability, or configuration of the disclosed technology. Rather, the ensuing detailed description of the preferred exemplary embodiments will provide those skilled in the art with an enabling description for implementing the preferred exemplary embodiments of the technology. Various changes may be made in the function and arrangement of elements without departing from the spirit and scope of the disclosed technology, as set forth in the appended claims.

To aid in describing the disclosed technology, directional terms may be used in the specification and claims to describe portions of the present technology (e.g., upper, lower, left, right, etc.). These directional definitions are merely intended to assist in describing and claiming the disclosed technology and are not intended to limit the disclosed technology in any way. In addition, reference numerals that are introduced in the specification in association with a drawing figure may be repeated in one or more subsequent figures without additional description in the specification, in order to provide context for other features.

With reference now to the drawings, a device is shown for teaching handwriting skills.

Referring to FIG. 1, reference number 100 refers generally to a handwriting glove apparatus. Handwriting glove apparatus 100 is shown and comprises a glove body 110, for receiving a user's hand. (For purposes of this disclosure, a glove, such as "glove 100" may refer to a left-handed glove, a right-handed glove, or a pair of gloves.)

Figure 3:
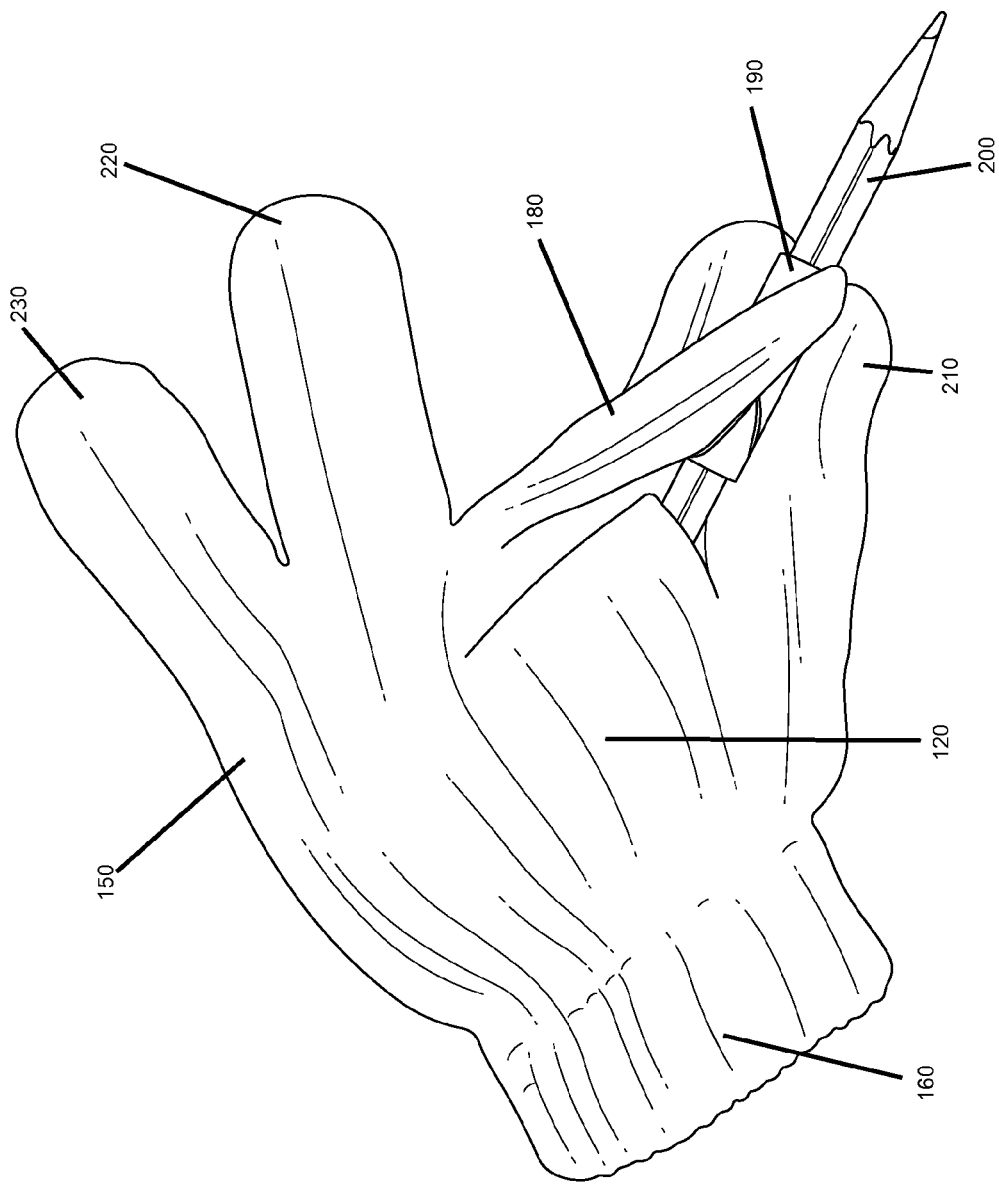
FIG. 3 is a perspective view of the handwriting glove apparatus device of the disclosed technology.

Referring now to both FIGS. 1 and 3. The glove body 110 has a palm side face 120, a back side face 130, a thumb lateral side region 140 and an opposed lateral side region 150. The glove body 110 further comprises a central component for receiving the palm of the user's hand, and a wrist cuff component 160 for placement around the user's wrist.

The glove body 110 also comprises three or more finger cavities extending from said central component for receiving the fingers and thumbs of said user's hand. There is a pointer finger cavity 170, a middle finger cavity 180 and a thumb finger cavity 210. It is within the scope of the disclosed technology to have just these three finger cavities of thumb, pointer and middle. When there are only three finger cavities the rest of the user's fingers would go through apertures.

A holder for a writing implement 190 is attached to the glove body 110 at finger cavities 170, 180, 210. This holder 190 has a hollow cylindrical body with an inner surface that grips the outer surface of a writing implement 200. The writing implement 200 is shown as a pencil but can be any writing implement that fits into writing implement holder 190. Pens, pencils and certain markers would fit into writing implement holder 190. It is also within the scope of the disclosed technology to have writing implement holders 190 that specifically hold well know thicker writing implements such as markers and crayons.

The outer surface of the hollow cylindrical body is attached to the glove body 110 at the thumb cavity 210, pointer finger cavity 170 and middle finger cavity 180, such that when the glove 100 is put on the hand, the hand is in the proper position to learn handwriting skills.

This embodiment of the handwriting glove apparatus has the holder 190 permanently attached to the thumb, pointer and middle finger cavities of the glove body 110 in a mature tripod grasp. This grasp positions the middle finger to one side of the writing implement. Wherein the writing implement is situated between the middle and distal knuckle of the middle finger. The grasp positions the pointer finger tip generally on the upper surface of the writing implement. Finally, the grasp positions the thumb on the opposite side of the writing implement from the middle finger.

Referring back to FIG. 1, the writing apparatus glove 100 is on the users hand with writing implement 200 placed in the holder for the writing implement 190. In this embodiment there are five finger cavities. Thumb lateral side region 140 has a thumb finger cavity 210. Pointer finger cavity 170. Middle finger cavity 180. Ring finger cavity 220. Pinky finger cavity 230. The ring finger cavity 220 and the pinky finger cavity 230 can alternatively be apertures for the user's fingers to go through but not be enclosed. FIG. 1 further shows the back side face 130 and a wrist cuff component 160 for placement around the user's wrist.

Figure 2:
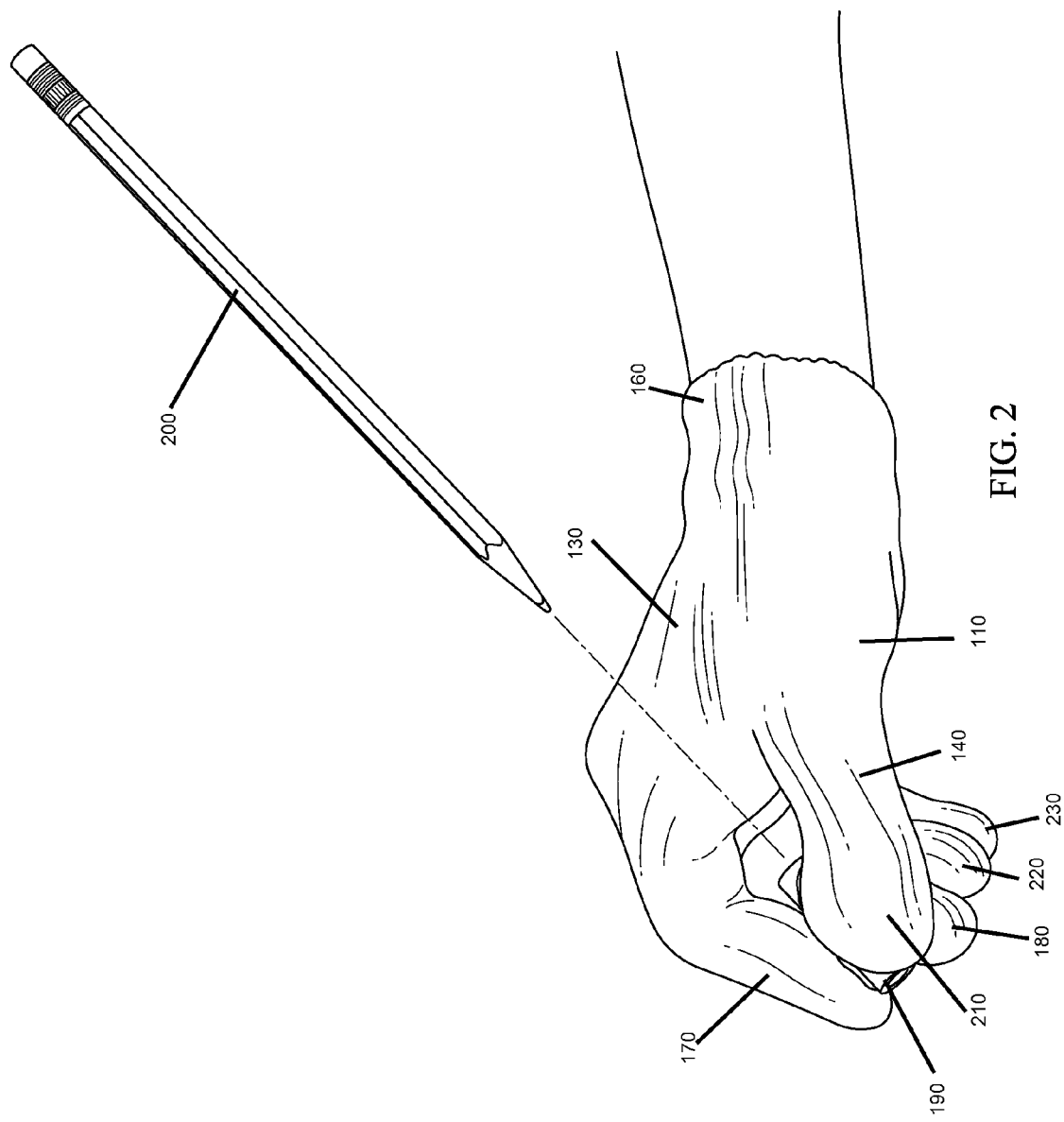
FIG. 2 shows a perspective view of the handwriting glove apparatus device as it is worn on the hand showing the insertion of a writing implement.

FIG. 2 shows the writing apparatus glove 100 placed on the user's hand but with out the writing implement 200 inserted in the writing implement holder 190. The fact that the writing implement itself is not permanently attached to the writing apparatus glove 100 has many advantages.

One advantage to not having the writing implement itself permanently attached is the ability to sharpen a pencil. If the writing implement were permanently attached the sharpening would be quite cumbersome. Moreover, there would not be much to sharpen before reaching the writing implement holder. Another advantage would be to refill a mechanical pencil or refill a refillable ink pen. Again, the ability to refill these items would be more difficult if the writing implement was permanently attached. A pen that runs out of ink could simply be replaced in this set up. Finally, a great advantage would be that if the glove get's dirty it can be washed. These are some but not all of the advantages of having a writing apparatus not permanently attached to the writing implement.

Now FIG. 2 has the writing apparatus glove 100 on the users hand and the holder for the writing implement 190 attached to the glove body 110 as described. In this embodiment, again there are five finger cavities. Thumb lateral side region 140 has a thumb finger cavity 210. Pointer finger cavity 170. Middle finger cavity 180. Ring finger cavity 220. Pinky finger cavity 230. The ring finger cavity 220 and the pinky finger cavity 230 can alternatively be apertures. FIG. 2 further shows the back side face 130 and a wrist cuff component 160 for placement around the user's wrist.

FIG. 3 shows the writing apparatus glove 100 not on the user's hand. FIG. 3 also shows the writing implement 200 in the writing implement holder 190. Again, this is the five finger cavity embodiment of the disclosed invention. Thumb lateral side region 140 has a thumb finger cavity 210. Pointer finger cavity 170. Middle finger cavity 180. Ring finger cavity 220. Opposed lateral side region 150 having a pinky finger cavity 230. The ring finger cavity 220 and the pinky finger cavity 230 can alternatively be apertures. FIG. 3 further shows palm side face 120 and a wrist cuff component 160 for placement around the user's wrist.

The glove body 110 can be made of any well know material in the art of making gloves. Preferable materials for making the glove body 110 are; neoprene, cotton, polyester, and leather. The writing implement holder can be made of any well know material in the art for holding writing instruments. These would include but are not limited to plastic, rubber, and foam.

The writing apparatus glove 100 can be made in different size glove bodies 110 to facilitate use by many different users' hand sizes. The writing implement holder 190 could come in many diameters. One size diameter of the inside of the writing implement holder 190, would be the common outer diameter of pens, pencils and some markers. Another writing implement holder 190 diameter size would be a common outer diameter size for some markers and crayons. The outer diameter of the writing implement 200 would fit on the inside diameter of the writing implement holder 190.

The preferred dimensions of the writing implement holder are: an outer diameter of 0.313 inch; the inner diameter is 0.25 inch; and the length is 1.66 inches. Another option is for a larger inner diameter of 0.625 inches to hold wider markers and crayons. The writing implement holder 190 is connected to the glove body 110 in any fashion that permanently connects it. Among these are: glue, hot glue, epoxy, sewn with thread.

Figure 4:
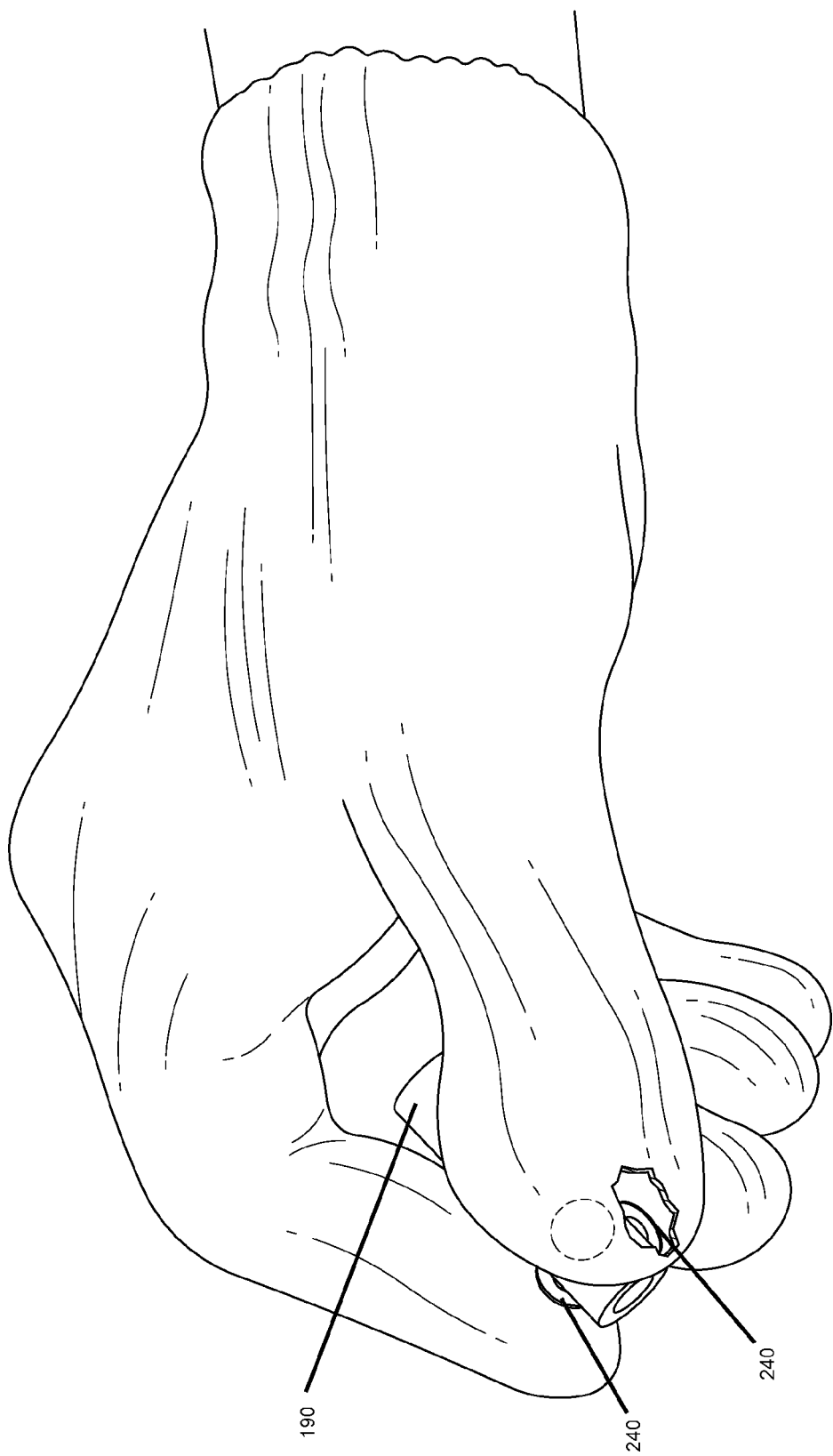
FIG. 4 is a perspective view of another embodiment of the handwriting glove apparatus of the disclosed technology.

In an alternative embodiment shown in FIG. 4, the writing implement holder 190 is connected with snaps 240 attached to both the glove body 110 at finger cavities 170, 180, 210 and the writing implement holder 190. These snaps 240 can unsnap and snap the writing implement holder 190 to the glove body 110. This way the writing implement holder 190 can be different diameter sizes for different diameter size writing implements 200. The different writing implement holder's 190 can snap in and out depending on the writing implement 200 used.

Figure 5:
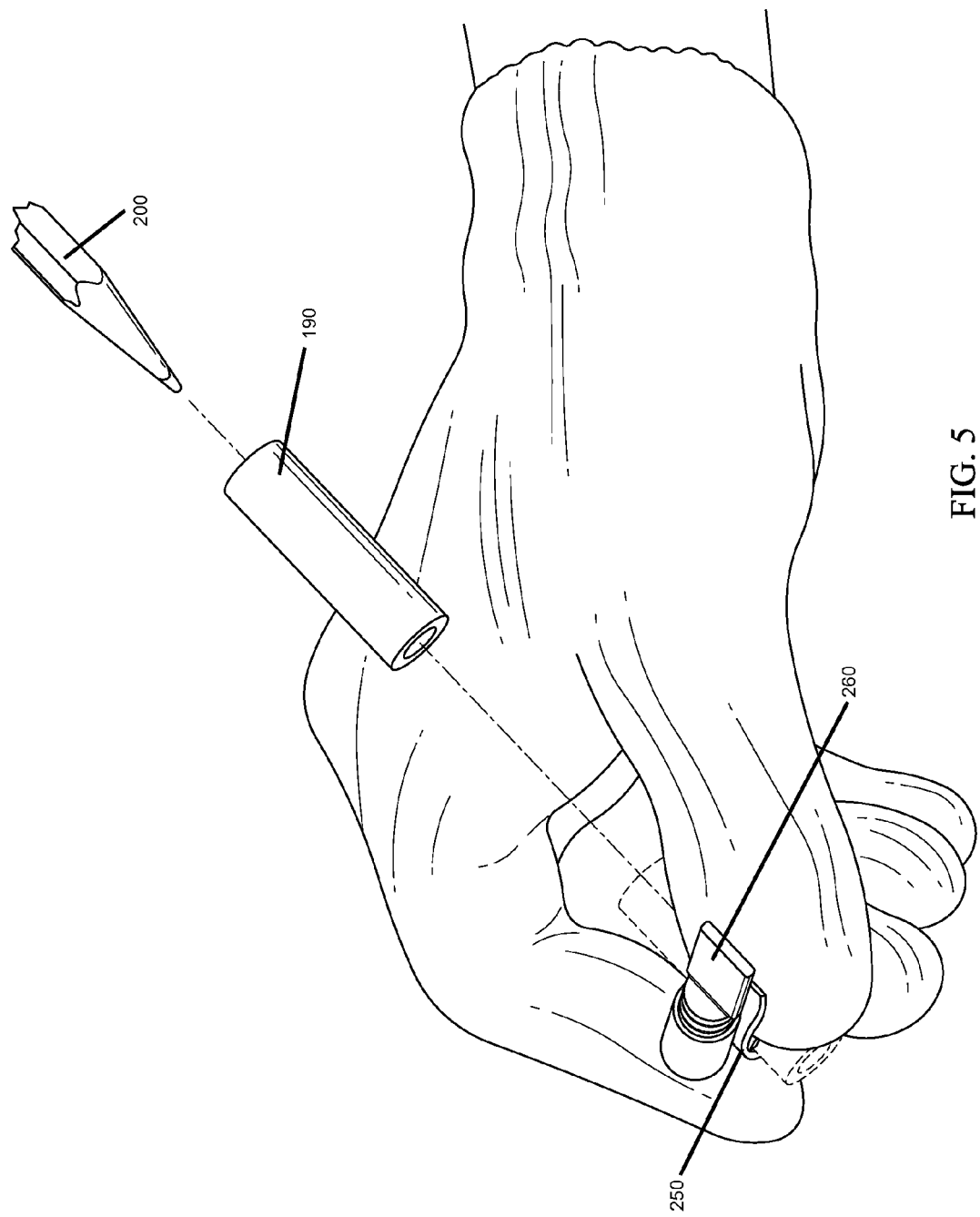
FIG. 5 is a perspective view of a third embodiment of the handwriting glove apparatus of the disclosed technology.

Now referring to FIG. 5, in this embodiment the glove body 110 is attached to a circular clamp 250 at finger cavities 170, 180, 210. The clamp 250 is attached to the glove body 110 the same way that the implement holder was in the previous embodiments. Now this circular clamp 250 can be adjusted in diameter by turning knob 260. Implement holder 190 is put into the adjustable clamp 250 and then writing implement 200 is placed in the implement holder 190. Now writing implement holder 190 can be different diameter sizes for different diameter size writing implements 200. The different writing implement holder's 190 are placed into the clamp 250 that is adjustable with knob 260.

Method of using the hand writing apparatus. First a user and their teacher would determine what writing implement 200 to insert in the writing implement holder 190. In one embodiment of the method of using the hand writing apparatus, the writing implement 200 would be placed in the writing implement holder 190 first as in FIG. 3.

After the writing implement 200 is placed in the writing implement holder 190 then the glove body 110 would be opened at the wrist cuff component 160 for the users hand to be placed inside the glove body 110. The user would then put his fingers in the appropriate finger cavities thumb cavity 210, pointer finger cavity 170, middle finger cavity 180, ring finger cavity 220 and pinky finger cavity 230. When all the fingers of the user are placed in the correct cavity, the wrist cuff component 160 is now placed around the user's wrist.

In a second embodiment of the method of using the hand writing apparatus, the glove body 110 would first be placed on the users hand before the writing implement 200 would be placed in the writing implement holder 190 as in FIG. 2. The glove body 110 would be opened at the wrist cuff component 160 for the users hand to be placed inside the glove body 110. The user would then put his fingers in the appropriate finger cavities thumb cavity 210, pointer finger cavity 170, middle finger cavity 180, ring finger cavity 220 and pinky finger cavity 230.

When all the fingers of the user are placed in the correct cavity then the wrist cuff component 160 is placed around the user's wrist. After the glove body 110 is placed on the user's hand, the writing implement 200 would be placed in the writing implement holder 190.

In a third and fourth embodiment of the method of using the hand writing apparatus, the glove body 110 would not have pinky or ring finger cavities. The glove body 110 would be opened at the wrist cuff component 160 for the users hand to be placed inside the glove body 110. The user would then put his fingers in the appropriate finger cavities; thumb cavity 210, pointer finger cavity 170, middle finger cavity 180. The ring finger would be placed in an aperture for the ring finger. The pinky finger would be placed into an aperture for the pinky finger.

When all the fingers of the user are placed in the correct cavity and aperture then the wrist cuff component 160 is now placed around the user's wrist. Again, the glove body 110 is placed on the user's hand either before or after the writing implement 200 would be placed in the writing implement holder 190.

Once the glove writing apparatus 100 is on the hand and the writing implement 200 is placed in the writing implement holder 190, the user's hand is ready to practice writing skills with their hand in the proper alignment for learning them.

It is recognized by those skilled in the art that changes may be made to the above described embodiments of the disclosed technology without departing from the broad inventive concept thereof. It is understood, therefore, that this technology is not limited to the particular embodiments disclosed, but is intended to cover all modifications which are in the spirit and scope of the disclosed technology.

I claim:

1. A handwriting glove apparatus comprising:
    a glove body for receiving a user's hand, said glove body having a palm side face, a back side face, a thumb lateral side region and an opposed lateral side region opposite said thumb lateral side region, said glove body comprising a central component for receiving the palm of said user's hand, a wrist cuff component for disposition around said user's wrist, and three or more finger cavities extending from said central component for receiving the fingers and thumbs of said user's hand;
    a writing implement;
    a hollow cylindrical body writing implement holder having an inner and outer surface, wherein the writing implement holder inner surface accepts a pressure fit of the outside surface of a writing implement; and
    said writing implement holder also having an outside surface that is permanently attached to the glove such that when a hand is in the writing apparatus holder the hand is in the proper position to learn handwriting skills.

2. The handwriting glove apparatus of claim 1, wherein five finger cavities extend from said central component for receiving the fingers and thumbs of said user's hand.

3. The handwriting glove apparatus of claim 1, wherein three finger cavities extend from said central component for receiving the pointer and middle fingers and thumb of said user's hand; and the pinky and ring fingers go through apertures in central component.

4. The handwriting glove apparatus of claim 1, wherein the hollow cylindrical body writing implement holder inner surface has a diameter of 0.25 inches.

5. The handwriting glove apparatus of claim 1, wherein the length of the hollow cylindrical body writing implement holder is 1.66 inches.

6. The handwriting glove apparatus of claim 1, wherein the hollow cylindrical body writing implement holder inner surface has a diameter of 0.625 inches.

7. The handwriting glove apparatus of claim 1, wherein the glove is sized to fit a child's hand.

8. The handwriting glove apparatus of claim 1, wherein the glove is sized to fit an adult female hand.

9. The handwriting glove apparatus of claim 1, wherein the glove is sized to fit an adult male hand.

10. The handwriting glove apparatus of claim 1, where the glove is made of one of the following materials; neoprene, cotton, polyester, and leather.

11. The handwriting glove apparatus of claim 1, wherein the hollow cylindrical body writing implement holder is made of one of the following materials: plastic; rubber; or foam.

12. The handwriting glove apparatus of claim 1, wherein the hollow cylindrical body writing implement holder is attached to the glove with glue or epoxy.

13. The handwriting glove apparatus of claim 1, wherein the hollow cylindrical body writing implement holder is attached to the glove with hot glue from a hot glue gun.

14. The handwriting glove apparatus of claim 1, wherein the hollow cylindrical body writing implement holder is attached to the glove by sewing with thread.

15. A handwriting glove apparatus comprising:
a glove body for receiving a user's hand, said glove body having a palm side face, a back side face, a thumb lateral side region and an opposed lateral side region opposite said thumb lateral side region, said glove body comprising a central component for receiving the palm of said user's hand, a wrist cuff component for disposition around said user's wrist, and three or more finger cavities extending from said central component for receiving the fingers and thumbs of said user's hand;
a writing implement;
a hollow cylindrical body writing implement holder having an inner and outer surface, wherein the writing implement holder inner surface accepts a pressure fit of the outside surface of a writing implement; and
said writing implement holder also having an outside surface that is attached to the glove at thumb, pointer and middle finger cavities of the glove in a mature tripod grasp such that when a hand is in the writing apparatus holder the hand is in the proper position to learn handwriting skills; and
wherein the mature tripod grasp positions the middle finger to one side of the writing implement and the writing implement is situated between the middle and distal knuckle of the middle finger; next the pointer fingertip generally on the top of the writing implement; and finally, the grasp positions the thumb to the opposite side of the writing implement from the middle finger; and
wherein the hollow cylindrical body writing implement holder is attached to the glove with snaps attached to both the glove and to the writing implement holder.

16. A method of using a handwriting glove apparatus to teach handwriting skills comprising the following steps:
donning a glove comprising a writing implement holder of a substantially tubular shape having an inner and outer surface, wherein the writing implement holder has an outside surface that is permanently connected to the glove such that when a hand is in the writing apparatus holder the hand is in the proper position to learn handwriting skills;
wherein the writing implement holder inner surface accepts a pressure fit of the outside surface of a writing implement; and
after said glove is on a user's hand placing a writing instrument in said writing implement holder.

17. A method of using a handwriting glove apparatus to teach handwriting skills comprising the following steps:
Placing a writing instrument into a glove comprising a writing implement holder of a substantially tubular shape having an inner and outer surface, wherein the writing implement holder has an outside surface that is permanently connected to the glove such that when a hand is in the writing apparatus holder the hand is in the proper position to learn handwriting skills;
wherein the writing implement holder inner surface accepts a pressure fit of the outside surface of a writing implement placed there; and
donning said glove on a user's hand.

18. A method of using a handwriting glove apparatus to teach handwriting skills of claim 17, wherein first a size of the glove apparatus to fit the user is determined, then the correct glove size is selected, then donning the glove.

19. A handwriting glove apparatus comprising:
a glove body for receiving a user's hand, said glove body having a palm side face, a back side face, a thumb lateral side region and an opposed lateral side region opposite said thumb lateral side region, said glove body comprising a central component for receiving the palm of said user's hand, a wrist cuff component for disposition around said user's wrist, and three or more finger cavities extending from said central component for receiving the fingers and thumbs of said user's hand;
a writing implement;
a circular adjustable clamp;
a hollow cylindrical body writing implement holder having an inner and outer surface, wherein the writing implement holder inner surface accepts a pressure fit of the outside surface of a writing implement;
said circular adjustable clamp having and inner and outer surface, wherein the clamp inner surface is adjusted to accept a pressure fit of the outside surface of a hollow cylindrical body writing implement holder; and
circular adjustable clamp also having an outside surface that is attached to the glove such that when a hand is in the writing apparatus holder the hand is in the proper position to learn handwriting skills.

20. The handwriting glove apparatus of claim 15, wherein the writing implement holder is a plurality of implement holders each having different diameters for different diameter writing implements and these writing implement holders are changed for different writing implements.

* * * * *